Patented Dec. 14, 1937

2,102,315

UNITED STATES PATENT OFFICE 2,102,315

PROCESS OF PREPARING AN ENZYME FROM MOLD

Wolfgang Grassmann and Hans Rubenbauer, Munich, Germany, assignors to August Karreth, Munich, Germany No Drawing. Application January 22, 1934, Serial No. 707,740. In Germany January 26, 1933

16 Claims. (Cl. 195—66)

Our invention relates to enzymes and to the process of preparing same from mold.

It is an object of our invention to obtain on an industrial or commercial scale enzymes which are suitable for therapeutic as well as for technical purposes.

To this end, we prepare individual enzymes, or mixtures of enzymes, from mold in such manner that the lichenase value of the enzymes or mixtures is over .1.

Our invention will be described with particular reference to enzymes which are highly effective in splitting cellulose and hemi-cellulose, and are useful for various technical, therapeutic, pharmaceutical, and other purposes. However, we are not limited to this particular kind of enzymes but our invention, as set out above, relates to enzymes, or mixtures of enzymes, of any kind which are prepared from mold and whose lichenase value is as indicated above.

Enzymes which are effective in splitting cellulose and hemi-cellulose, have already been prepared from malt, and also from intestines of snails. A fungus, Aspergillus cellulosae, which yields such enzymes, has been found in the paunch of cattle, and preparations which contain cellulase and hemi-cellulase, have been made from another fungus, Aspergillus oryzae. However, the preparation of the aforesaid enzymes from the above-mentioned materials on an industrial or commercial scale is impracticable. Some of the materials can only be procured with difficulty and their content of active substance is so small that economic preparation of the enzymes therefrom is impossible. Other materials are more suitable in these respects but the processes of preparation hitherto employed are so inefficient that the activity of the preparations obtained is very low.

It is another object of our invention to provide an improved process for the preparation of effective enzymes on an industrial or commercial scale.

To this end, we continue the culture of mold on a suitable nutrient medium beyond the mycelium stage and up to the formation of spores.

Referring particularly to the preparation of the said highly effective cellulose and hemi-cellulose splitting enzymes, we have found that these are obtained on an industrial or commercial scale by the continuation of the culture, as described.

It is known that a mixture of enzymes, consisting chiefly of amylase, is obtained from Aspergillus oryzae by interrupting the culture at a stage of development in which the formation of mycelium has reached its maximum and the formation of conidiophores is just commencing. At this stage which under the now usual conditions of cultivation, is attained after about 42 to 48 hours, the quantity of amylase reaches an optimum. Upon continuation of the culture, the quantity slowly decreases.

By continuing the culture of the mold beyond this amylase optimum and up to the formation of spores, as described, we obtain the unexpected and novel effect that the quantity and activity of the cellulase and hemi-cellulase steadily increase on further culture, until finally about twice the original value is attained. We are able to obtain definite values of activity for the cellulase and the hemi-cellulase, which has never been done heretofore.

The following easily recognizable criteria permit the ascertaining of the stages of the culture:

Towards the end of the mycelium stage, the mass is interspersed with white mycelia throughout, and conidiophores are already at the stage of conidia formation. Upon continuation of the growth according to our invention, the formation of spores is recognized by their color which is yellow to yellow-green for Aspergillus oryzae. When the entire mass shows the color change, the cultivation is interrupted.

The time required by the mold for attaining the final stage or color change, varies considerably and is determined substantially by the conditions under which the culture is performed, such as the temperature, the character of the nutrient medium, the addition of nutrient salts, activators, and the like, and other factors which may have a considerable influence on the time.

For observing the stages of the culture, the following methods may be used:

The optimum of the amylase formation may be ascertained as described by Willstätter-Schudel, Berichte der deutschen chemischen Gesellschaft, vol. 51, 1918, page 780, with starch as substrate, and the optimum of the produced cellulose and hemi-cellulose splitting enzymes may be ascertained with reprecipitated cellulose as substrate.

The lichenase value may be ascertained by the methods described by P. Karrer, B. Joos and M. Staub in Helv. chim. acta, Vol. VI, 1923, page 800, and by P. Karrer, B. Joos, M. Staub and A. Weinhagen, ibid., Vol. VII, 1924, page 144. As mentioned, the lichenase value should be over .1, and values of about .7 are obtained by performing the process in the manner described.

Our invention is applicable to a wide variety of molds, and the following kinds of molds are recited by way of example only, without in any way limiting our invention:

All Aspergilli, for instance, Aspergillus candidus, Aspergillus cellulosae, Aspergillus niger, Aspergillus flavus, Aspergillus terreus, Aspergillus wentii; molds whose properties are similar to those of the Aspergilli, for instance, molds of the Penicillium or Rhizopus genus; molds of other kinds, for instance, of the Botrytis genus, such as Botrytis cinerea, or Botrytis verrucosa, of the Fusarium genus, such as Fusarium solani, Fusarium oxysporum, or Fusarium scirpi, or of the Oidium genus, such as Oidium aurianticum; molds of the Mucor type.

Nutrient media for the cultivation of the molds according to our invention preferably contain cellulose in addition to sufficient quantities of albuminous substances and mineral salts. Suitable media are, for instance, grain seeds, malt, bran, sawdust impregnated with nutrient solutions such as albumen solutions, peptones, mineral salts, etc.

A nutrient medium for the cultivation of molds from which cellulose and hemi-cellulose splitting enzymes are to be prepared, should contain albumen, low carbohydrates, such as mono-, di-, and tri-saccharides, mineral salts, cellulose and hemi-cellulose. Mechanically, it should be loose and porous.

In carrying out the process, the nutrient medium produces an acid or, in extreme cases, a neutral reaction. Thus, the nutrient medium must be non-alkaline, i. e. acid or neutral.

Enzymes, or mixtures of enzymes, prepared according to our invention, contain cellulase and several hemi-cellulases, including, for instance, hemi-cellulases which attack xylane, pectin, mannanes, chitin, etc. They further contain amylase, cellobiase, glucosidases, proteases, and phosphatases.

The enzymes, or mixtures, are obtained from the mass by extraction with water and may be worked up by the usual processes.

The separation of individual enzymes from a mixture of enzymes may be effected in the usual manner, for instance, by adsorption and subsequent elution. The usual adsorption agents, such as carbon, silica, kaolin, metal oxides and metal hydroxides, may be used, but natural oxidic minerals, such as bauxite and diaspore, may also be used.

Inert ballast substances are extensively removed, and the inuline- and mannane-splitting ferment is eliminated, by dialysis.

The separation of individual enzymes may also be effected with the aid of alcohol, and ballast substances and substances of unpleasant taste are eliminated at the same time. Such substances may also be eliminated by treating the powdered enzymes with diluted alcohol.

Our invention will be better understood by referring to the following examples in which the preparation of enzymes from several kinds of molds are described.

*Example I*

1.5 kilograms (kg.) of bran are mixed with 3 kg. of water, the mixture is stirred and sterilized for one hour at 120° centigrade, allowed to cool down to about 30° centigrade, and inoculated with about .15 gram (g.) of ripened *Aspergillus oryzae* spores. The culture is then permitted to develop in the mass with aeration at 30° to 45° centigrade. When spores have formed to the amount required, which takes three to six days and is indicated by the yellow to yellow-green color of the mass, as described, the culture is interrupted, the mass is diluted with water at the rate of about ten times its own volume, and filtered at low temperature. The filtrate or aqueous extract is concentrated by evaporation in vacuo, or dried in any suitable manner.

The lichenase value of the enzyme or mixture thus obtained is .5 to 1. For a definition of the lichenase value, see the above-mentioned articles from Helv. chim. acta.

The cellulose-splitting action of the enzyme preparation thus obtained is as follows: One cubic centimetre (ccm.) of a 2.5% solution acting on 150 milligrams (mg.) of cellulose hydrate at pH 5.2 (1/20 molar phosphate buffer) in volume of 20 ccm., shows within 24 hours and at 37° centigrade a hydrolysis corresponding to a consumption of two to three ccm. of $\frac{1}{10}$ normal iodine solution, as determined by the method of Willstätter-Schudel, see supra.

*Example II*

1.5 kilograms of bran are mixed with 3 kg. of water, the mixture is stirred and 15 g. of a mixture of nutrient salts are added. The composition of the nutrient mixture is as follows:

| | Grams |
|---|---|
| Potassium sulfate | 46.2 |
| Calcium sulfate | 34.0 |
| Calcium phosphate | 140.0 |
| Magnesium sulfate | 61.5 |
| Ammonium nitrate | 5.7 |

The mass is sterilized for one hour at 120° centigrade, allowed to cool down to about 30° centigrade, and inoculated with about .15 g. of ripened *Aspergillus oryzae* spores. The culture is then permitted to develop in the mass with aeration at 30° to 45° centigrade. When spores have formed to the amount required, which takes 2½ to 5 days and is indicated by the color as described, the culture is interrupted, the mass is diluted with water at the rate of about ten times its own volume, and filtered at low temperature. The filtrate or aqueous extract is concentrated by evaporation in vacuo, or dried in any suitable manner. The enzymatic efficiency, as an average, is somewhat higher than in Example I.

*Example III*

4.2 kg. of fresh malt, from the fourth day of germination, are mixed with water until the water content is 50%, sterilized for one hour at 120° centigrade, and inoculated with .35 g. of ripened *Aspergillus oryzae* spores. The culture is then permitted to develop at 30° to 45° centigrade, as described and, when spores have formed, as also described, which takes three to six days, the culture is interrupted, the mass is diluted with water at the rate of about four times its own volume, filtered at low temperature and concentrated by evaporation, or dried, as described. The lichenase and cellulase efficiencies are within the limits laid down in Example I.

*Example IV*

2 kg. of bran are mixed with 3 kg. of water, the mixture is stirred and sterilized for one hour at 120° centigrade, allowed to cool down to about 30° centigrade, and inoculated with about .25 g. of ripened *Penicillium glaucum* spores. The culture is permitted to develop at 30° to 45° centigrade, as described and, when spores have formed, as also described, which takes four to six days, the culture is interrupted, the mass is diluted with water at the rate of about ten times its own volume, and filtered at low temperature and concentrated by evaporation, or dried, as described. The lichenase and cellulase efficiencies are within the limits laid down in Example I.

*Example V*

The mass is prepared and sterilized as in Example IV. After it has cooled down to about 30° centigrade, it is inoculated with about .2 g. of ripened *Rhizopus nigricans* spores. The culture is permitted to develop as described in Example IV, and, when spores have formed after three to six days, the mass is diluted, filtered, concentrated or dried, as described in Example IV. The lichenase and cellulose efficiencies are also within the limits laid down in Example I.

*Example VI*

The mass is prepared, sterilized and cooled to about 30° centigrade, as described in Examples IV and V, and inoculated with about .25 g. of ripened *Botrytis cinerea* spores. The culture is permitted to develop as described in Examples IV and V, the spore formation being completed after 4 to 6 days. The mass is diluted, filtered, concentrated or dried, as described in Examples IV and V. With *Botrytis cinerea*, the lichenase efficiency is about 40% less, and the cellulase efficiency is about 30% higher than the limits laid down in Example I.

The subsequent treatment of the mass has already been referred to above, and dialysis was mentioned as an expedient for removing or eliminating certain substances. Dialysis is performed as follows: The filtered enzyme-extract, or extracts, are slightly concentrated and dialyzed for about five days against flowing water by an animal membrane. The purified extract, or extracts, in solution are filtered again and concentrated by evaporation in vacuo. As compared with the preparations described, the enzyme values of the purified preparations is increased 10 to 20 times.

For purification and separation by adsorption, 20 ccm. of an enzyme solution which has been dialyzed as described, are mixed with 20 ccm. of acetate-acetic acid buffer, pH 3.5, and 4 g. of animal charcoal, replenished to 120 ccm. agitated for five minutes, and filtered. The adsorbate is eluted with sodium bicarbonate, and 55% of the lichenase are found in the elution, while xylanase is not present.

To obtain a preparation from *Aspergillus oryzae* which is without amylase, the dry enzyme mixture obtained is digested for two hours with a diluted acid at pH2–2.5 and filtered at low temperature. The extract is evaporated in vacuo or dried in any suitable manner. The preparation thus obtained is absolutely free from amylase.

To remove substances of unpleasant taste, the dry enzyme mixture is stirred with a moderate amount of alcohol of about 85% the excess of alcohol is removed by suction, the preparation is washed with alcohol and dried. The powder which is obtained by this treatment, is practically flavorless.

We claim:

1. The process of preparing an enzyme preparation which comprises cultivating a mold on a non-alkaline nutrient medium containing a cellulose substance, continuing the cultivation of the culture beyond the mycelium stage and up to the formation of spores, extracting the culture mass and concentrating the extract to produce an enzyme preparation which has a lichenase value of 0.5 to 1.0 and is effective to split cellulose an hemi-cellulose.

2. The process of preparing an enzyme preparation which comprises cultivating a mold on a non-alkaline nutrient medium containing a cellulose substance, continuing the cultivation of the culture beyond the mycelium stage and up to the formation of spores, extracting the culture mass, concentrating the extract and separating the individual enzymes from said extract to produce an enzyme substance which has a lichenase value of 0.5 to 1.0 and is effective to split cellulose and hemi-cellulose.

3. The process of preparing an enzyme preparation which comprises cultivating a mold on a non-alkaline nutrient medium containing a cellulose substance, continuing the cultivation of the culture beyond the mycelium stage and up to the formation of spores, extracting the culture mass, concentrating the extract and separating the individual enzymes from said extract by adsorption with an adsorbent selected from the class which consists of carbon, silica, kaolin, metal oxides, metal hydroxides, bauxite and diaspore to produce an enzyme substance which has a lichenase value of 0.5 to 1.0 and is effective to split cellulose and hemi-cellulose.

4. The process of preparing an enzyme preparation which comprises cultivating a mold on a non-alkaline nutrient medium containing a cellulose substance, continuing the cultivation of the culture beyond the mycelium stage and up to the formation of spores, extracting the culture mass, dialyzing the extract, and concentrating the solution to produce an enzyme substance which has a lichenase value of 0.5 to 1.0 and is effective to split cellulose and hemi-cellulose.

5. The process of preparing an enzyme preparation which comprises cultivating a mold on a non-alkaline nutrient medium containing a cellulose substance, continuing the cultivation of the culture beyond the mycelium stage and up to the formation of spores, extracting the culture mass, dialyzing the extract, treating the dialyzed extract with an adsorbent selected from the class which consists of carbon, silica, kaolin, metal oxides, metal hydroxides, bauxite and diaspore to produce an enzyme substance which has a lichenase value of 0.5 to 1.0 and is effective to split cellulose and hemi-cellulose.

6. The process of preparing an enzyme preparation which comprises cultivating a mold of the Aspergilli genus on a non-alkaline nutrient medium containing a cellulose substance, continuing the cultivation of the culture beyond the mycelium stage and up to the formation of spores, extracting the culture mass, and concentrating the extract to produce an enzyme preparation which has a lichenase value of 0.5 to 1.0 and is effective to split cellulose and hemi-cellulose.

7. The process of preparing an enzyme preparation which comprises cultivating a mold of the Aspergilli genus on a non-alkaline nutrient medium containing a cellulose substance, continuing the cultivation of the culture beyond the mycelium stage and up to the formation of spores, extracting the culture mass, concentrating the extract and separating the individual enzymes from said extract to produce an enzyme substance which has a lichenase value of 0.5 to 1.0 and is effective to split cellulose and hemi-cellulose.

8. The process of preparing an enzyme preparation which comprises cultivating a mold of the Aspergilleae genus on a non-alkaline nutrient medium containing a cellulose substance, continuing the cultivation of the culture beyond the mycelium stage and up to the formation of spores, extracting the culture mass, drying the extract, treating the extract with a dilute acid at pH 2-2.5, and concentrating the solution to produce an enzyme substance which has a lichenase value of 0.5 to 1.0 and is effective to split cellulose and hemi-cellulose.

9. The process of preparing an enzyme preparation which comprises cultivating a mold of the Botrytis genus on a non-alkaline nutrient medium containing a cellulose substance, continuing the cultivation of the culture beyond the mycelium stage and up to the formation of spores, extracting the culture mass, and concentrating the extract to produce an enzyme preparation which has a lichenase value of 0.5 to 1.0 and is effective to split cellulose and hemi-cellulose.

10. The process of preparing an enzyme preparation which comprises cultivating a mold of the botrytis genus on a non-alkaline nutrient medium containing a cellulose substance, continuing the cultivation of the culture beyond the mycelium stage and up to the formation of spores, extracting the culture mass, concentrating the extract and separating the individual enzymes from said extract to produce an enzyme substance which has a lichenase value of 0.5 to 1.0 and is effective to split cellulose and hemi-cellulose.

11. The process of preparing an enzyme preparation which comprises cultivating a mold of the Mucor genus on a non-alkaline nutrient medium containing a cellulose substance, continuing the cultivation of the culture beyond the mycelium stage and up to the formation of spores, extracting the culture mass, and concentrating the extract to produce an enzyme preparation which has a lichenase value of 0.5 to 1.0 and is effective to split cellulose and hemi-cellulose.

12. The process of preparing an enzyme preparation which comprises cultivating a mold of the Mucor genus on a non-alkaline nutrient medium containing a cellulose substance, continuing the cultivation of the culture beyond the mycelium stage and up to the formation of spores, extracting the culture mass, concentrating the extract and separating the individual enzymes from said extract to produce an enzyme substance which has a lichenase value of 0.5 to 1.0 and is effective to split cellulose and hemi-cellulose.

13. The process of preparing an enzyme preparation which comprises cultivating a mold on a non-alkaline nutrient medium containing albumen, sugars, a nutrient salt mixture, cellulose and hemi-cellulose, continuing the cultivation of the culture beyond the mycelium stage and up to the formation of spores, extracting the culture mass and concentrating the extract to produce an enzyme preparation which has a lichenase value of 0.5 to 1.0 and is effective to split cellulose and hemi-cellulose.

14. The process of preparing an enzyme preparation which comprises cultivating a mold on a non-alkaline nutrient medium containing albumen, sugars, a nutrient salt mixture, cellulose and hemi-cellulose, continuing the cultivation of the culture beyond the mycelium stage and up to the formation of spores, extracting the culture mass, concentrating the extract and separating the individual enzymes from said extract to produce an enzyme substance which has a lichenase value of 0.5 to 1.0 and is effective to split cellulose and hemi-cellulose.

15. The process of preparing an enzyme preparation which comprises cultivating a mold on a non-alkaline nutrient medium which is porous and loose and contains a cellulose substance, continuing the cultivation of the culture beyond the mycelium stage and up to the formation of spores, extracting the culture mass and concentrating the extract to produce an enzyme preparation which has a lichenase value of 0.5 to 1.0 and is effective to split cellulose and hemi-cellulose.

16. The process of preparing an enzyme preparation which comprises cultivating a mold on a non-alkaline nutrient medium which is porous and loose and contains a cellulose substance, continuing the cultivation of the culture beyond the mycelium stage and up to the formation of spores, extracting the culture mass, concentrating the extract and separating the individual enzymes from said extract to produce an enzyme substance which has a lichenase value of 0.5 to 1.0 and is effective to split cellulose and hemi-cellulose.

WOLFGANG GRASSMANN.
HANS RUBENBAUER.